United States Patent [19]

Murphy

[11] 4,330,834

[45] May 18, 1982

[54] GRAPHICS DISPLAY APPARATUS

[75] Inventor: Alan S. Murphy, Eastleigh, England

[73] Assignee: International Business Machines Corp., Armonk, N.Y.

[21] Appl. No.: 143,247

[22] Filed: Apr. 24, 1980

[30] Foreign Application Priority Data

May 2, 1979 [GB] United Kingdom ................. 7915281

[51] Int. Cl.³ ............................................. G06F 3/153

[52] U.S. Cl. .................................... 364/521; 340/739; 340/750; 364/719

[58] Field of Search ............... 364/515, 521, 719, 855; 340/739, 747, 748, 750, 753

[56] References Cited

U.S. PATENT DOCUMENTS

| | | | |
|---|---|---|---|
| 3,729,730 | 4/1973 | Sevilla et al. | 340/750 |
| 3,781,850 | 12/1973 | Gicca et al. | 340/747 |
| 3,810,166 | 5/1974 | Atkin | 349/750 X |
| 3,821,730 | 6/1974 | Carey et al. | 340/750 |
| 4,158,837 | 6/1979 | Zahorsky | 340/747 X |
| 4,163,229 | 7/1979 | Bodin et al. | 340/745 |
| 4,246,578 | 1/1981 | Kawasaki et al. | 340/750 |

FOREIGN PATENT DOCUMENTS

| | | |
|---|---|---|
| 2400493 | 7/1975 | Fed. Rep. of Germany . |
| 1518149 | 7/1978 | United Kingdom . |

*Primary Examiner*—Jerry Smith
*Attorney, Agent, or Firm*—W. S. Robertson

[57] ABSTRACT

In a cell-organized graphic display apparatus a set of canonical or standard cells is stored in a character generator. A data processor loads character codes into a character buffer and attribute bits into an attribute buffer. Lines to be displayed are computed on a cell-by-cell basis by the processor using pairs of canonical cells and the computed character codes are stored in the character buffer and attribute bits representing displacements of the required canonical cells are loaded into the attribute buffer. During accessing of the character generator, an adder shifts the bit patterns in accordance with the attribute bits. Optionally a second character buffer, a second character generator and a logic mixer are used to allow logical combining of cell images in accordance with attribute bits.

9 Claims, 16 Drawing Figures

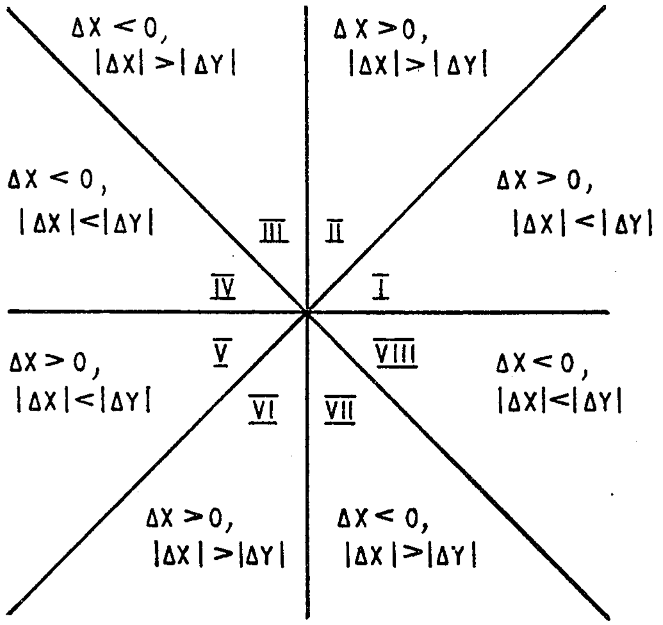
FIG. 6
FIG. 5
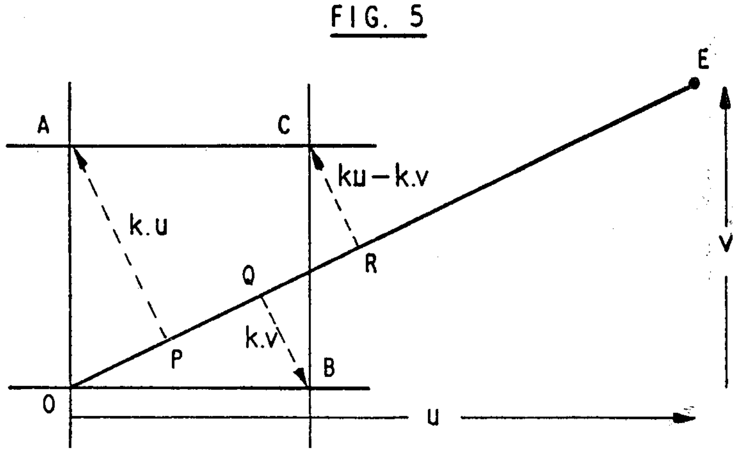

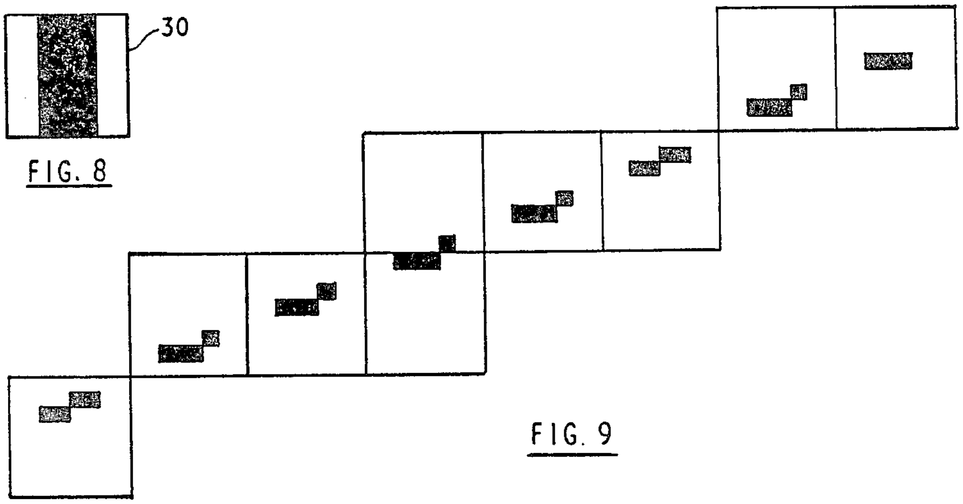
FIG. 8
FIG. 9
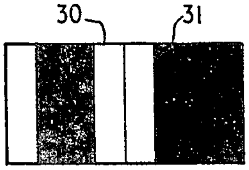
FIG 10
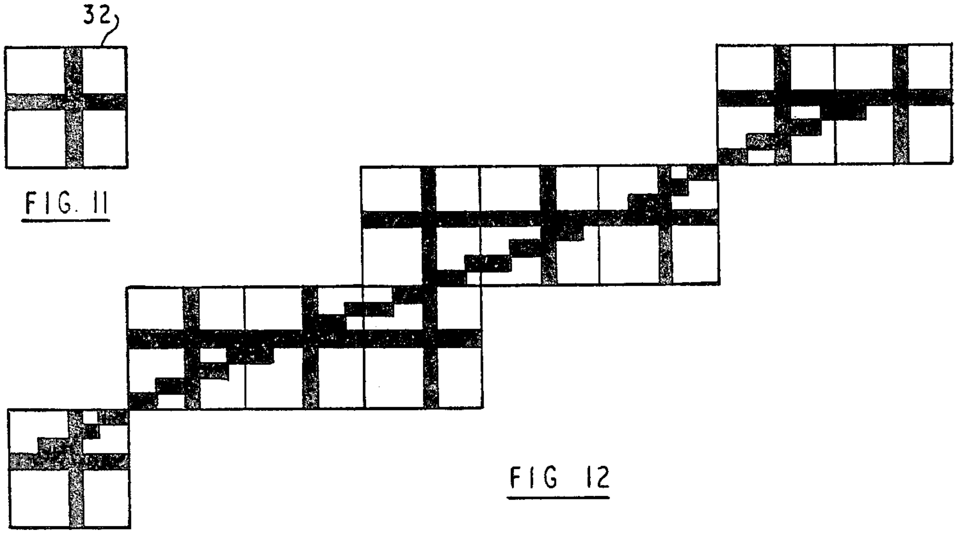
FIG. 11
FIG 12

GRAPHICS DISPLAY APPARATUS

RELATED APPLICATION

Application Ser. No. 099,804 filed Dec. 3, 1979 for "Cell Organized Line Raster" by A. S. Murphy which is now U.S. Pat. No. 4,308,532 (UK Application 49276/78) has helpful background information relating to a character generator for a graphics display.

INTRODUCTION

This invention relates to a cell-organized graphic display apparatus in which pictures containing graphical information can be built up from a set of standard or canonical cells.

Computer-driven video display units can be categorized into two main types, the directed beam cathode ray tube type such as the IBM 3250 display system in which the CRT beam is swept across the screen and the point addressable type in which selected points of the display device are illuminated. The latter type can consist of a raster-scan cathode ray tube or a matrix display such as a gas plasma panel. The second type can be further sub-divided into those in which the complete picture is generated from a picture buffer containing an indication of which points need to be illuminated and those in which the picture is built up from a number of character or graphic cells, each cell having associated therewith a pointer, stored in a buffer, which points to the bit pattern required to build up that cell.

The advantages and disadvantages of these different types of video display apparatus as applied to cathode ray tube devices are reviewed in the article by B. W. Jordan, Jr. and R. C. Barrett in "Communications of the ACM," Volume 17, Number 2, (February 1974) at pages 70 to 77, entitled "A cell-organized raster for line drawings". This article describes a raster scan CRT display employing a character buffer and a character/-cell generator which contains a number of basic cells. To avoid having two large a character/cell generator when a complicated picture is to be displayed, the article describes an arrangement in which the character/-cell generator uses a set of basic patterns stored in a read-only store. These basic patterns can be manipulated (by translation, relection and masking) to derive other cell patterns. Although such an arrangement does save on storage space in the character/cell generator, it has the disadvantage of requiring complicated refresh logic.

SUMMARY OF THE INVENTION

According to the present invention, a cell-organized graphic display apparatus comprises a point-addressable display device, a character buffer adapted to contain character codes of image cells to be displayed, a character generator adapted to contain bit patterns representing image cells including a set of canonical cells, means for reading character codes from said character buffer to access related bit patterns within said character generator, means for applying said accessed bit patterns to said display device, and a data processor adapted to load said character buffer with character codes representing image cells required to be displayed on said display device, characterized in that said apparatus further includes an attribute buffer adapted to contain attribute bits associated with the character codes stored in said character buffer and means adapted to shift the bit patterns obtained from said character generator in accordance with associated attribute bits contained in said attribute buffer, and characterized in that said data processor is operable when a line is required to be displayed on said display device to select a pair of canonical cells whose slopes span the slope of the required line, to compute the displacements of the chosen canonical cells required to display said required line, and to store character codes representing said required canonical cells in said character buffer and attribute bits indicative of their required displacements in said attribute buffer.

Although the invention will be described with respect to a raster-scan refreshed cathode ray tube, those skilled in the art will appreciate that the invention is also applicable to other forms of point addressable displays, for example, a gas plasma panel, or to a plotter/printer.

THE DRAWINGS

The invention will now be particularly described, by way of example, with reference to the accompanying drawings in which:

FIG. 1 is a block diagram of a cell-organized CRT display apparatus,

FIG. 2 shows a set of standard or canonical cells from which a graphical image can be built up, FIG. 3 illustrates a line formed from two of the canonical cells of FIG. 2 in accordance with the present invention, FIG. 4 illustrates, for comparison purposes, the same line formed according to Bresenham's algorithm, FIG. 5 is used in an explanation of Bresenham's algorithm, FIG. 6 shows the relationship between various parameters and the eight possible octant directions, FIG. 7 is a block diagram of a first embodiment of the invention, FIGS. 8 and 9 illustrate how a cell pattern may be logically ANDed with the cells forming the line of FIG. 3 to give a dotted line, FIG. 10 illustrates cell patterns which may be logically ANDed with the cells forming the line to give a dot-dash effect, FIGS. 11 and 12 illustrate how a cell pattern may be logically ORed with the cells forming the line of FIG. 3 to give a composite display, FIG. 13 illustrates the use of the logical EXCLUSIVE OR function, FIG. 14 is a block diagram of a second embodiment of the invention, FIG. 15 is a block diagram of a third embodiment of the invention, and FIG. 16 is a block diagram of a mixer which may be used in the embodiment of FIG. 15.

DETAILED DESCRIPTION

Introduction—FIG. 1

Referring now to FIG. 1, a cell-organized raster-scan CRT display apparatus comprises a processor 1, for example a microprocessor, which can communicate with a remote central processing unit (CPU), not shown, over a data communications link 2. Various input/output devices such as keyboards, light pens, digitizing tablets, and printers can be connected to an input/output bus 3 of the processor 1 as represented schematically by 4. Also connected to I/O bus 3 is a character buffer 5 which is sufficiently large to be able to store one character code or pointer for each character cell position on CRT screen 6. The picture on the CRT screen 6 is composed from a matrix of character cells, each consisting of $m \times n$ displayable points.

The buffer 5 is preferably a mapped buffer as is the case with the IBM 3277, 3278 and 8775 display terminals although alternatively the buffer may be of the unmapped sort. In a mapped buffer, the characters are stored at positions within the buffer which correspond to the character cell positions on the screen so that characters need only be read sequentially from the buffer during screen refresh. In an unmapped buffer characters in the buffer are not stored at positions corresponding to their display positions but are stored with an address indicative of their position on the screen. The present invention is applicable to both types of character buffer but a mapped buffer is assumed for descriptive purposes. In a mapped buffer arrangement, the character buffer 5 can be constituted with recirculating shift registers, as in the IBM 3277 display or as a random access memory, as in the IBM 3278 and 8775 displays. An unmapped buffer will be in the form of a random access memory because accessing during refresh is not performed sequentially according to position.

A character/cell generator 7 contains bit patterns representative of the different characters which can be displayed. As well as patterns representing alphanumeric characters, patterns representing pictorial or graphic characters are also stored in the character generator 7. The character generator 7 can either be in the form of a read only store or alternatively, for more flexibility can be constituted by a read/write memory which can be loaded with bit patterns from the processor 1 via input/output bus 3 and line 8.

During refresh of the CRT display screen 6, the refresh logic 9 will read character codes into a line buffer 10 so that the line buffer 10 will sequentially contain the character codes for each line of cells on the display. The character codes in the line buffer 10 are used to address the character generator 7 and resulting bit patterns are serialized in a serializer 11 for onward transmission to the analogue circuits, not shown, associated with the CRT display 6. It is believed that those skilled in the art will be aware of the operation of the apparatus thus far described without the need for a further detailed description of the various parts of the refresh circuits and various buffers.

As described in the related application, various techniques can be used to keep the size of the character generator 7 to a reasonable size when pictorial images are to be displayed on the screen. The aforementioned Patent Specification describes an arrangement in which the character generator is loaded with bit patterns as required. When the character generator is full, parts of the picture are displayed at lower resolution to release space in the character generator for the storage of further bit patterns. The aforementioned article by Jordan and Barrett describes an alternative arrangement in which a set of basic bit patterns are stored in a character generator in the form of a read only store. Pictures are generated by manipulation of these basic bit patterns using complicated refresh logic.

In any graphics image display apparatus, one basic requirement is to generate a line or vector between two points. The article by J. E. Bresenham in the IBM System Journal, 1965, Vol. 4, No. 1, pages 25 to 30, entitled "Algorithm for the Computer Control of a Digital Plotter" describes an algorithm for plotting a line between two points: this algorithm has since become known as Bresenham's Algorithm. In the embodiments to be described, a set of basic or canonical cells is used and straight lines can be generated from these cells using an algorithm somewhat akin to Bresenham's Algorithm.

The Canonical Cells—FIG. 2

FIG. 2 shows a set of 17 canonical cells, identified as A(O) to S(O) for lines having slopes between 0° and 90°. Lines having slopes between 90° and 180° (that is with negative slopes) could be formed by a similar set of 15 canonical cells or by mirror imaging the set of cells shown in FIG. 2. It is preferred however, for simplicity, that a full set of 32 canonical cells be used as this will allow a line of any slope to be formed without the need for complex transposition of the bit patterns. In FIG. 2, each cell is constituted by an $8 \times 8$ matrix of pels (picture elements) but it will be appreciated that any suitably sized matrix can be used. The number of cells in the set will depend upon the size of the matrix.

An Example—FIGS. 3 and 4

FIG. 3 illustrates how a line between end points $X_1Y_1$ and $X_2Y_2$ can be generated using two of the canonical cells (D and E) shown in FIG. 2. The full algorithm will be described with reference to FIGS. 5 and 6 but briefly, the two canonical cells having slopes which bound the desired slope, i.e., $(Y_2-Y_1)/(X_2-X_1)$, are chosen and these are manipulated by simple vertical shifting to generate the desired line. As is well known, Bresenham's Algorithm allows a line to be computed without complex multiplication or division, the Algorithm using just addition, subtraction and comparison. In FIG. 3, the designation D(3) indicates that the canonical cell D(O) (FIG. 2) has been shifted three positions upwards and the designation E(4) indicates that the canonical cell E(O) (FIG. 2) has been shifted four positions upwards. The designation D(−2) indicates that the canonical cell D(O) (FIG. 2) has been shifted two positions downwards. Because the end points $X_1Y_1$ and $X_2Y_2$ are located within the cells and not at their edges, certain pels are removed from the bit pattern by masking as will be described in more detail below. This is represented in FIG. 3 by the shaded pels.

Before describing the algorithm in more detail, reference will be made to FIG. 4 which shows a line joining end points $X_1Y_1$ and $X_2Y_2$ and generated bit-by-bit using Bresenham's Algorithm. Comparison of FIGS. 3 and 4 shows that the cell-generated line shows more perturbations from the ideal straight line than does the bit-generated line but has a resolution and linearity which are acceptable.

FIG. 5 shows a line OE that rises v units vertically in u units horizontally. The perpendicular distances of points A and B to the line are proportional to u and v respectively, that is $PA = k.u$ and $QB = k.v$. Therefore a movement from O to A changes the error term DIF (distance from ideal line) by $-k.u$ and a movement from O to B changes the error term by k.v. Thus a diagonal movement from O to C will change the error term by $k.d. = k.v - k.u$. In the linear example each cell is an $8 \times 8$ matrix and only vertical shifting is used. A movement of 8 horizontal and N (N is from 0 to 8) vertical steps will change the error difference DIF by $(8 \times k.v) - (N \times k.u)$ (Formula A).

The Line Generation Process

In the following explanation, the proportionality constant k has been dropped for simplification. The line generation process is as follows:

1. Calculate the slope of the line in terms of $\Delta X = X_2 - X_1$ and $\Delta Y = Y_2 - Y_1$
2. Determine in which octant the line is according to $\Delta X < 0$ or $\Delta X > 0$ $\Delta Y < 0$ or $\Delta Y > 0$ $|\Delta X| > |\Delta Y|$. (FIG. 6 illustrates the various octants for different values of these parameters. In the example shown in FIG. 3, octant I is used. Lines in octants I and IV cause vertical shifting; lines in octants II and III are cause horizontal shifting. Lines in octants V, VI, VII and VIII should be treated with their end points reversed and then considered to be lines in octants I, II, III and IV respectively. Lines in octants III and IV (and VII and VIII) need to invoke the mirror image canonical cells, preferably as the set of 15 extra canonical cells mentioned above with reference to FIG. 2.)
3. Let v = minimum of $\Delta X$ and $\Delta Y$ and u = maximum of $\Delta X$ and $\Delta Y$
4. Select N (the number of vertical steps) such that $(N \times u) \leqq (8 \times v) < (N+1) \times u$ (Equation B) (Thus for each 8 horizontal steps there will be either N (shallow) or N+1 (Steep) vertical steps).
5. Using Formula A above, calculate the two error correction terms for each of the two cell steps. $dP = (8 \times v) - (N+1)u$ (the steeper step) $vP = (8 \times v) - (N \times u)$ (the shallower step) and calculate the threshold term $$PT = (8 \times v) - (N + \tfrac{1}{2})u = (dP + vP)/2$$

6. Generate or obtain the two canonical cells having slopes on either side of $\Delta Y/\Delta X$. (Note that certain slopes, for example 45°, require only one canonical cell for generation.)
7. Form the start address and initial residue by dividing $X_1$ and $Y_1$ by 8 to obtain the quotient and remainder (RES). (For numbers represented as binary values, this can be done by shifting 3 places to the right.)
8. If PT is negative then use the steeper slope cell to start, otherwise use the shallower slope cell to start.
9. Derive the mask by the X-RESIDUE, the vertical shift from the Y-RESIDUE, and the position of the first pel in the cell (ISTEP).
10. Calculate the error at the right hand edge of the cell
    $DIF = ((8 - XRES) \times v) - ((N + 1 - ISTEP) \times u)$ for steep cell or
    $DIF = ((8 - XRES) \times v) - ((N - ISTEP) \times u)$ for shallow cell
    and modify RESIDUE (YRES)
11. Calculate the last cell by dividing $X_2$ and $Y_2$ by 8 to obtain quotient (FPT) and remainder.
12. Enter loop consisting of steps 13 to 20. A prime mark (') indicates the updated value of the appropriate quality for the next cell
13. If last cell has been reached (PT = FPT) go to step 17, otherwise test for DIF < PT and go to step 14 or 15
14. If DIF < PT, use shallow slope cell
    Update DIF' = DIF + Vp
    X change = +8
    Y change = +N
    and proceed to step 16
15. If DIF ≧ PT, use steeper slope cell
    Update DIF' = DIF + dp
    X change = +8
    Y change = +N+1
    and proceed to step 16
16. Update YRES' = YRES + Y change
    If YRES ≧ 8 then change PT(y), update YRES- = YRES − 8 update PT(x) = PT(x) + 8 and return to step 13 (IF YRES > 8, an extra cell is generated immediately by taking the last cell and subtracting 8 from the displacement. In the example shown in FIG. 3, YRES = 9 when cell D(6) was generated: therefore cell D(−2) is also generated. This will also be seen in Table I below. If YRES = 8 then YRES is set to 0 and no extra cell is generated.)
17. Form last cell by testing for DIF < TP and going to step 18 or 19
18. If DIF < TP, use shallow slope cell and go to step 20
19. If DIF ≧ TP, use steep slope cell and go to step 20.
20. Use remainder of $X_2$ 8 from step 11 to obtain masking position for the last point.

Line Generation—The Example of FIG. 3

The use of this algorithm will now be described with reference to FIG. 3. Assume that the point $X_1 Y_1$ is at (1, 4), the origin of the cell containing it being (9, 0). The origin of the last cell is at (56, 24) and the end point $X_2 Y_2$ is at (60, 28).

Thus for initialization
$\Delta X = X_2 - X_1 = 59$
$\Delta Y = Y_2 - Y_1 = 24$
Therefore v = 24 and u = 59
N = 3 (from Equation 2)
dP = −44 vP = +15
PT = 14.5

From slope $\Delta Y/\Delta X = 24/59$, choose canonical cells D and E which have slopes $\frac{3}{8}$ and 4/8 respectively. Start cell is at (0, 0) and remainder is (1, 4).
As PT is negative use E cell which is steeper
XRES = 1 (gives mask)
YSHIFT = YRES − ISTEP = 4 − 0 = 4
Thus the first cell is E (4) with x = 1 bit masked
$DIF = (7 \times 24) - (4 \times 59) = -68$ Table I below shows the values PTx, PTy, DIF, YRES during the loop and indicates how each cell in FIG. 3 is derived.

| PTx | PTy | DIF | YRES | DIF < 14.5 ? | YRES > 8? | CELL | XCHANGE | YCHANGE | DIF' | YRES' |
|---|---|---|---|---|---|---|---|---|---|---|
| 0 | 0 | — | 4 | — | — | E(4) | +8 | +4 | −68 | 8 |
| 8 | 8 | −68 | 0 | YES | NO | D(0) | +8 | +3 | −53 | 3 |
| 16 | 8 | −53 | 3 | YES | NO | D(3) | +8 | +3 | −38 | 6 |
| 24 | 8 | −38 | 6 | YES | NO | D(6) | 0 | +3 | −23 | 9 |
| 24 | 16 | — | 9 | — | YES | D(4) | — | — | — | 1 |
| 32 | 16 | −23 | 1 | YES | NO | D(1) | +8 | +3 | −7 | 4 |
| 40 | 16 | −7 | 4 | NO | NO | E(4) | +8 | +4 | −51 | 8 |
| 48 | 24 | −51 | 0 | YES | NO | D(0) | +8 | +3 | −36 | 3 |

-continued

| PTx | PTy | DIF | YRES | DIF < 14.5 ? | YRES > 8? | CELL | XCHANGE | YCHANGE | DIF' | YRES' |
|---|---|---|---|---|---|---|---|---|---|---|
| 56 | 24 | −36 | 3 | YES | NO | D(3) | — | — | — | — |

The Apparatus of FIG. 7

Apparatus for performing the algorithm will now be described with reference to FIG. 7. The apparatus includes a character buffer 14 which can be loaded with character or symbol codes from a processor 13, by means of line 15. The character buffer 14 has associated therewith an attribute buffer 16 containing attribute bytes which qualify the corresponding character codes within the buffer 16. Each character code has a corresponding attribute byte, which, inter alia indicates by how much the cell pattern represented by the character code in the buffer 14 must be shifted either horizontally or vertically. Thus in FIG. 7 by way of example, the character buffer 14 is shown containing character codes representing the cells needed to generate the line of FIG. 3 and the attribute buffer 16 is shown containing attributes which indicate the amount of vertical shifting of the bit patterns represented by those character codes. The set of canonical or basic cells shown in FIG. 2 is stored within a character generator 17 which is addressed by means of address signals on line 18 from the character buffer 14 and the output 19 of an adder 20.

Those skilled in the art will appreciate that normally the character generator would be addressed by the output of the character buffer and a signal on the scan line 21 which derives the bits for each scan line from the character generator. In FIG. 7, however, the signal on the scan line 21 is added to the attribute value on line 22 by the adder 20 to take care of the vertical cell displacement. The output bits on line 23 are shifted through horizontal shift logic 24 to ensure proper horizontal displacement. As indicated above, vertical shifting is employed for lines in octants I, IV, V and VIII and horizontal shifting is employed for lines in octants II, III, VI and VII. Note that only one form of displacement will be required, horizontal or vertical but not both. Thus the attribute buffer 16 will contain one bit which determines whether horizontal or vertical displacement is required and controls the appropriate logic (i.e., adder 20 or horizontal shift logic 24). Bit patterns on line 25 are gated through gate 26 to the digital to analogue circuits of the video display under control of overflow/underflow output 27 of adder 20. The overflow/underflow signal inhibits "wrap-around" of the bit pattern. For example, in FIG. 3, an overflow signal on line 27 inhibits the bits 12 in cell D(6) and an underflow signal inhibits the bits 12 in cell D(−2). Refresh control logic 28 controls timing of the various parts during refresh of the CRT display screen.

It will be appreciated that the arrangement shown in FIG. 7 will cause the line of FIG. 3 to be displayed including the end pels 12 and 13. Display of these pels may be prevented by either of two ways. Either, the relevant end cells can be manipulated in the processor with the bit patterns required to produce these end cells being stored in the character generator 17 by means of line 29: corresponding character codes or pointers would be stored in the character buffer 14. Alternatively, the standard canonical cells could be stored in the character buffer together with attribute bytes in the attribute buffer 16 which are used to access a mask contained within a mask store, not shown in FIG. 7: such a masking technique will be described in detail below with reference to FIG. 14.

Logical Combinations of Patterns—FIGS. 8–13

Before proceeding to FIG. 14, reference will be made to FIGS. 8 to 13 which show the effect of logically combining different bit patterns. In FIG. 8, a bit pattern 30 is shown which when logically ANDed with the bit patterns producing the line of FIG. 3 results in a dotted line 5 shown in FIG. 9.

In FIG. 10, bit patterns 30 and 31 are shown which when logically ANDed with the bit patterns forming the line of FIG. 3 results in a dotted-dashed line, not shown.

FIG. 11 shows a bit pattern 32 which is generally cruciform in shape and which when logically ORed with the bit patterns forming the line of FIG. 3 results in a grid being superimposed over the displayed line as is shown in FIG. 12.

Figure 14:
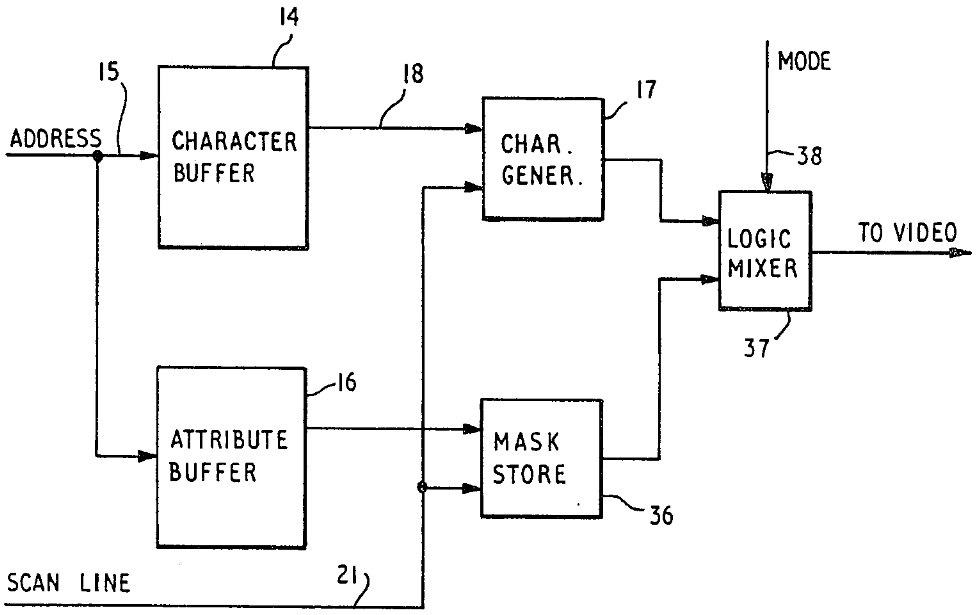

Bit Masking—FIG. 14

FIG. 14 schematically illustrates the basic apparatus which allows such masking of the bit patterns. Similar reference numerals have been used to those in FIG. 7 to denote similar parts. Various parts, such as the processor control logic and adder, have been omitted from FIG. 14 for reasons of clarity. A mask store 36 contains bit patterns representing various masks which can be logically combined with the bit patterns derived from the character generator 17. Although it is shown as separate from the character generator 17, those skilled in the art will appreciate that physically it could form part of the character generator 17. Attribute bytes stored in the attribute buffer 16 are used to access the particular required mask from the mask store 36 simultaneously with accessing of the bit patterns in the character generator 17 by the character codes within the character buffer 14. The resulting bit patterns are then logically combined in the logic mixer 37 in accordance with a mode signal in line 38. In other words, mixer 37 will logically combine according to the logical OR, AND, EXCLUSIVE OR functions etc. in accordance with the mode signal on line 38. The mode signal may be derived in any convenient manner but preferably is derived from the attribute buffer 16 since in this way each bit pattern from the character generator 17 can be logically combined according to an associated attribute byte giving greater flexibility. For attribute bits would allow 16 possible digital mixing functions. The mask store 36 can be constituted by a read only store or can be writeable to allow different masks to be loaded therein.

The hardware configuration could be generalized from the simple arrangement shown in FIG. 14 so that the mask store 36 is equivalent to a second loadable character generator: there would then be two character buffers, two character generators and an attribute buffer which controls the digital mixing function. Thus a cell which contains an alphanumeric character and a line can be formed by deriving the alphanumeric character bit pattern from one character generator, deriving the line bit pattern from the other character generator and ORing these two bit patterns in the mixer under control of the attribute bits. This technique of "post generation masking" gives the important advantage that a large variety of different cell images can be placed on the display screen without requiring a large character generator containing a bit pattern for each different cell. For example, to display a histogram may require 16 different cells shapes with 8 different types of textures or shading. Using a conventional character generator would require $16\times 8=96$ cells to be stored but using the post generator masking technique would require only $16+8=24$ entries in the character generators.

Figure 15:
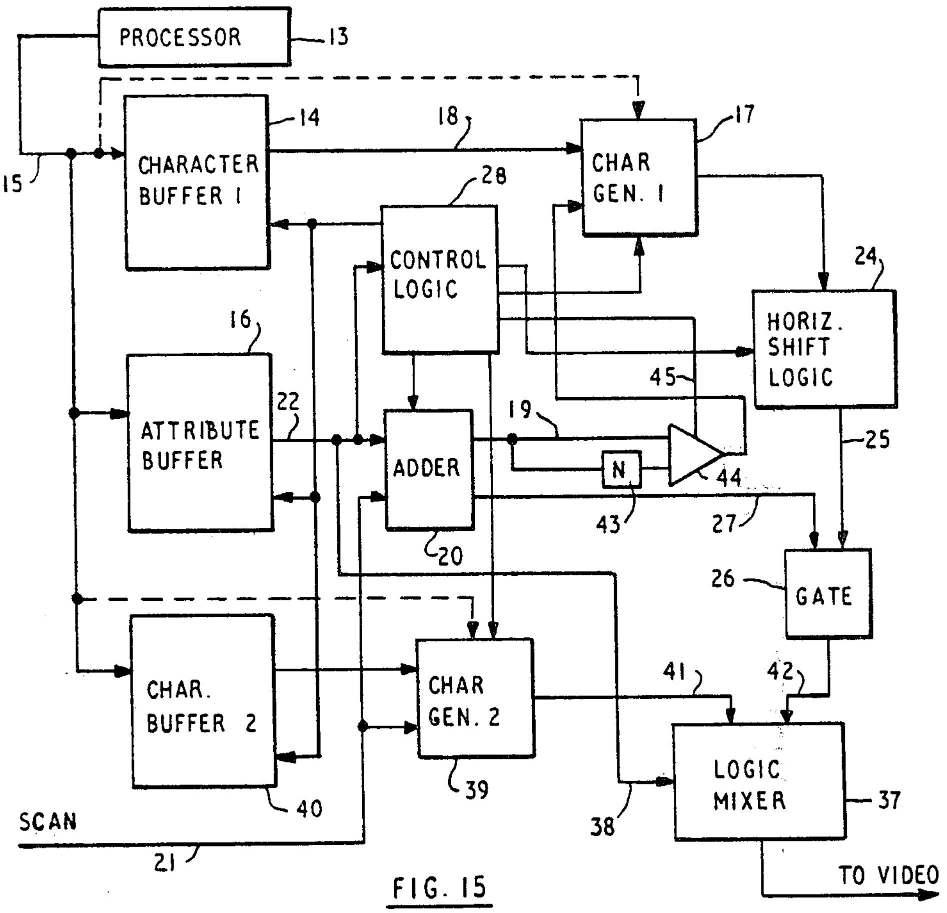

Detailed Apparatus Description—FIG. 15

Figure 1:
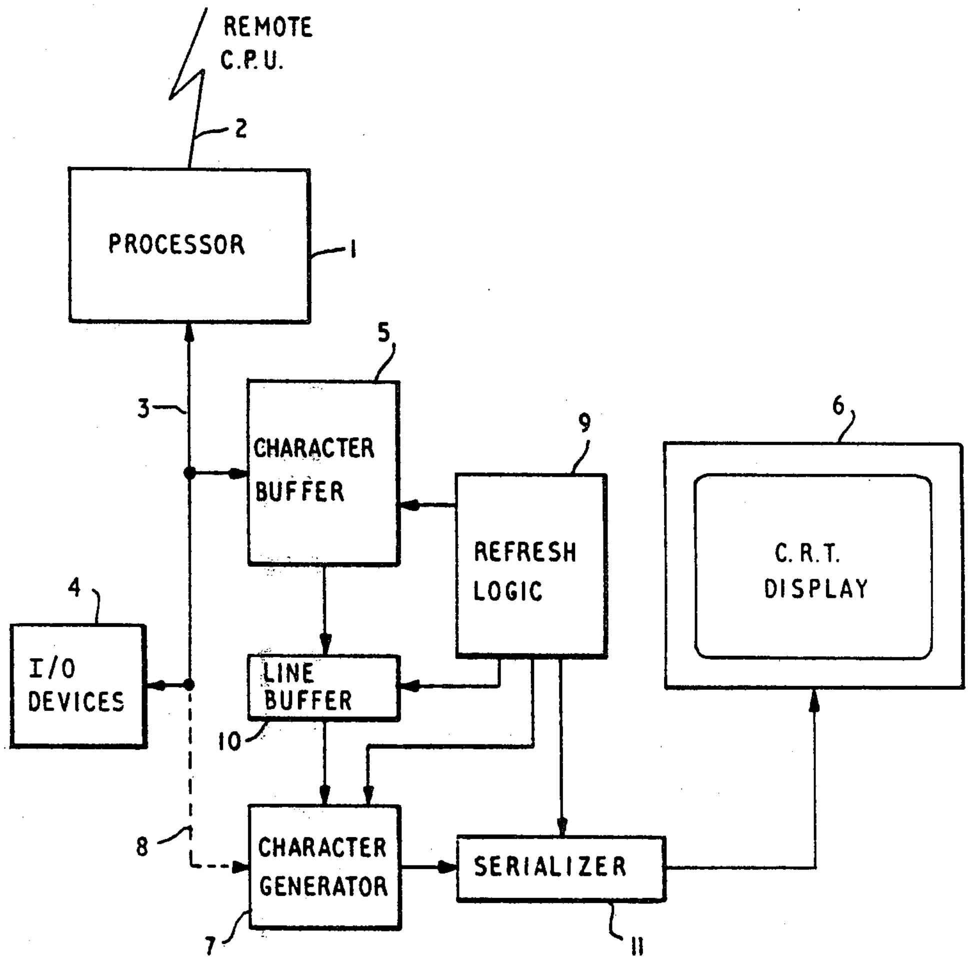
Figure 2:
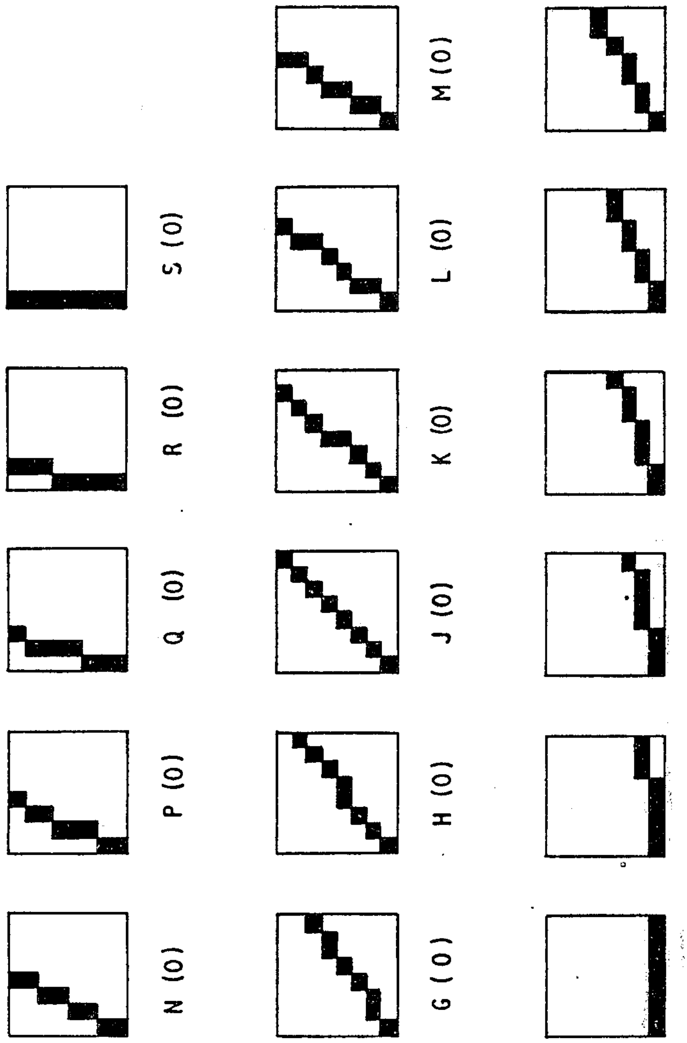
Figure 3:
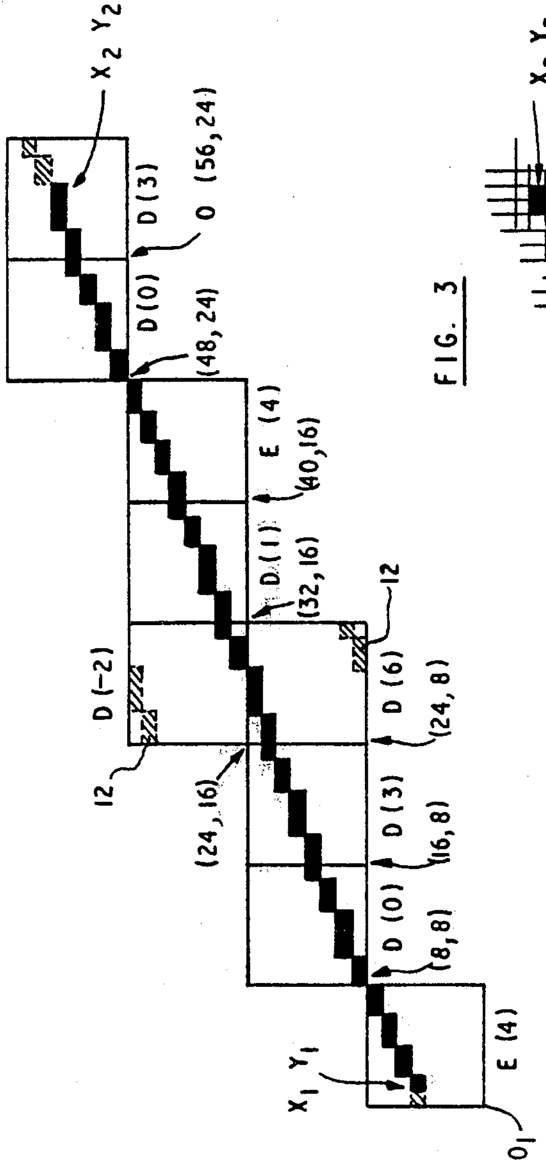
Figure 4:
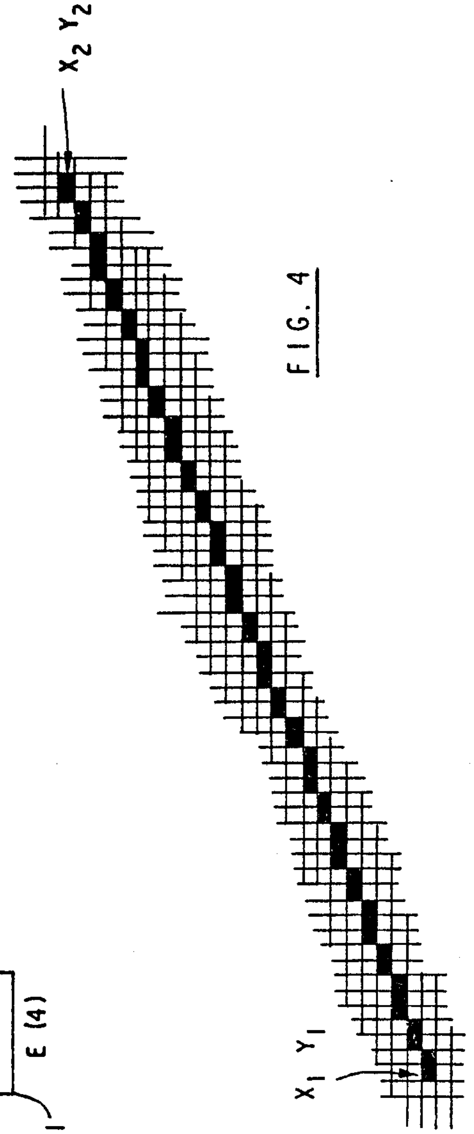
Figure 7:
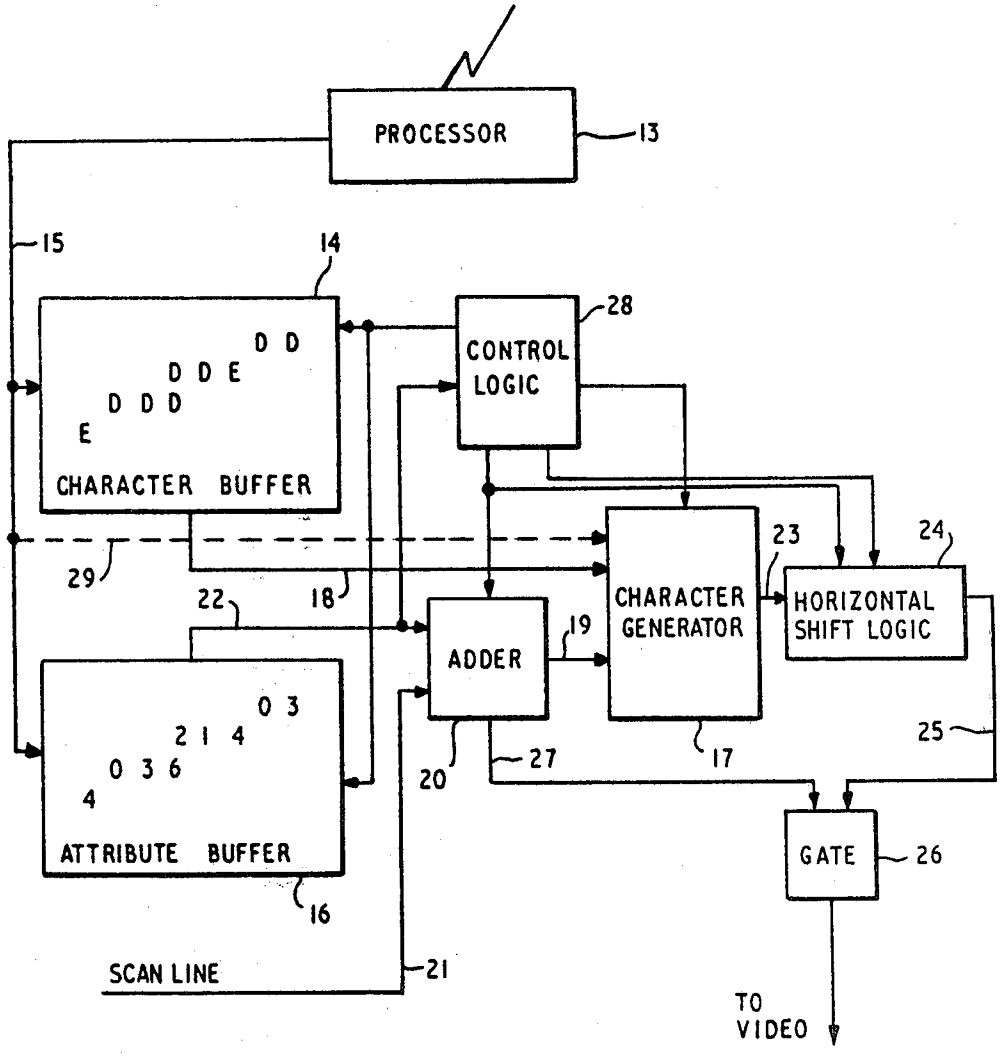
Figure 13:
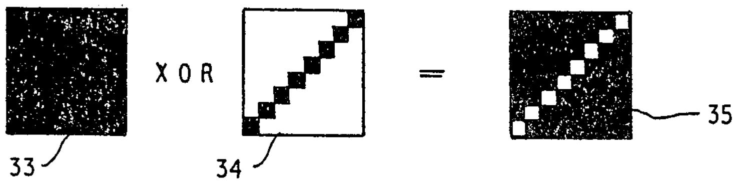
FIG. 13 illustrates how the logic EXCLUSIVE-OR operation between a completely "black" bit pattern and a bit pattern 34 results in the bit pattern 34 being displayed in reverse video as shown by 35.

FIG. 15 is a block diagram illustrating a preferred embodiment of the invention in which vertical or horizontal shifting can be applied to the cell patterns in the manner of FIG. 7 and post generation mixing is employed somewhat in the manner of FIG. 14. Similar reference numerals are employed for similar parts. Instead of using a mask store addressable from the attribute buffer as was the case with FIG. 14, FIG. 15 uses a second character generator 39 which is addressable by a second character buffer 40. The character code or pointer stored in the character buffer 40 accesses the bit pattern stored in the character generator 39. The resulting bit pattern is supplied as one input 41 of the logic mixing 37. The character code or pointer stored in the character buffer 14 accesses the bit pattern which is stored in the character generator 17 which is shifted vertically, if necessary, under the control of attribute bits from the attribute buffer 16 and the adder 20. The resultant bit pattern is shifted horizontally, if required in the horizontal shift logic 24, and gated through the gate 26 to the input 42 of the logic mixer 37. Mixing of the bit patterns at inputs 41 and 42 of the mixer 37 is then accomplished in accordance with the attribute bits on line 38 from the attribute buffer 16. If each cell position on the screen has associated therewith an 8-bit attribute byte, some of these attribute bits can be used to control the amount of horizontal or vertical shifting and some can be used to control the logical mixing function for that cell in the mixer. If necessary, more than one attribute byte can be used for each cell position.

As described above, the apparatus preferably makes use of a full set of canonical cells and does not therefore require reflection. However if desired, lines with slopes between 90° and 180° can be formed by mirror-imaging or reflecting a cell of slope between 0° and 90° about the horizontal axis. This can be readily accomplished by using the inverted output of the adder 20. This is shown in FIG. 15 where an inverter 43 is connected to the true output 19. The true or inverted output is selected by funnel 44 under control of line 45 from control logic 28. In FIG. 15, the scan line 21 directly addresses the character generator 39. If it is desired to be able to shift and rotate the bit patterns within character generator 39, the scan line will need to be connected to it through an adder in a similar manner as adder 20: with such an arrangement, horizontal shift logic (not shown) and a gate (not shown) would also need to be employed in a similar manner to logic 24 and gate 26.

Figure 16:
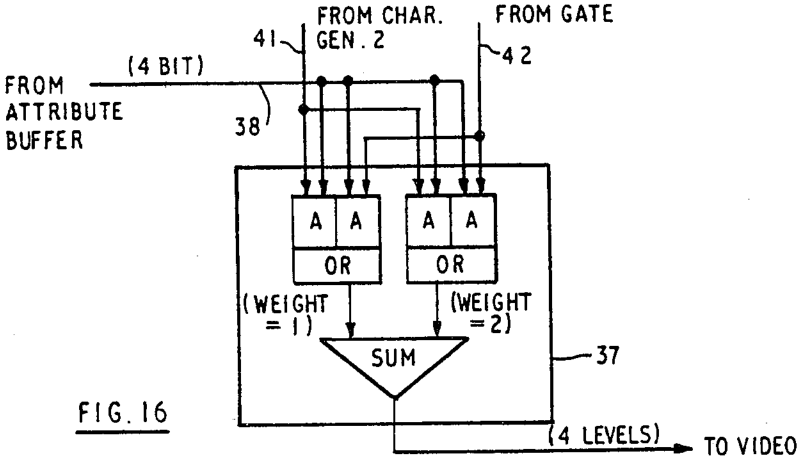

The embodiment of FIG. 15 can be readily adapted to produce a grey scale display by replacing the logic mixer 37 by an analogue mixer that electrically sums the two bit patterns or images (P and Q) according to the equation $$\text{video}=(A\times P)+(B\times Q)$$

where A and B are weighting values which may be preset constants or are supplied from the attribute buffer. FIG. 16 shows such an analogue mixer (where $A=2$ and $B=1$) able to produce 4 levels of grey (black+3 brightness) and which allows background information to be placed on the first level, foreground information to be placed on the second level, and highlighted data to be placed on the brightest level. This grey scale rendering of lines or areas is possible with little extra storage requirement compared with the duplication of bit buffer which would be required if a character graphics arrangement such as that described were not used.

What has been described is a cell-organized graphics display apparatus which, apart from displaying alphanumeric characters, can display graphical images based on cells. Where a line is to be displayed, a pair of canonical cells is chosen and the desired line is approximated on a cell-by-cell basis using a modification of Bresenham's algorithm. Bit patterns are shifted in accordance with attribute bits stored in an attribute buffer. Masks or other image cells can be logically mixed to create combinations of cells. This is in contrast to the arrangement disclosed by Jordan and Barrett, referenced above, where not only complicated shifting, reflection and masking logic is required in the character generator but also a line is first approximated on a bit-by-bit basis using Bresenham's algorithm and then cells are manipulated to equate that computed line.

Having thus described my invention, what I claim as new, and desire to secure by Letters Patent is:

1. A cell-organized graphic display apparatus comprising a point-addressable display device, a character buffer adapted to contain character codes of image cells to be displayed, a character generator adapted to contain bit patterns representing image cells including a set of canonical cells, means for reading character codes from said character buffer to access related bit patterns within said character generator, means for applying said accessed bit patterns to said display device, and a data processor adapted to load said character buffer with character codes representing image cells required to be displayed on said display device, wherein the improvement comprises, an attribute buffer having means to store attribute bits associated with the character codes stored in said character buffer, means for shifting the bit patterns obtained from said character generator in accordance with associated attribute bits stored in said attribute buffer, said data processor having means for receiving an input identifying the end points of a line that is required to be displayed on said display device, means for selecting a pair of canonical cells whose slopes span the slope of the required line, and having means for computing the displacements of the chosen canonical cells required to display said required line, and means for storing character codes representing said required canonical cells in said character buffer and for storing attribute bits indicative of their required displacements in said attribute buffer.

2. Apparatus as claimed in claim 1, wherein said shifting means includes an adder connected to receive attribute bits from said attribute buffer and having means for modifying the address of said character generator in accordance with the attribute bits.

3. Apparatus as claimed in claim 2, wherein said adder has means for producing an overflow/underflow output and said apparatus includes means responsive to the overflow/underflow output for controlling the gating of said accessed bit patterns through a gate to prevent displaying data shifted out of the region of a pattern being formed.

4. Apparatus as claimed in either of claims 2 or 3, including means for selecting the true or inverted output of said adder to allow selective rotation of the bit pattern associated with a selected image cell.

5. Apparatus as claimed in claim 2, wherein said shifting means includes horizontal shift logic connected to receive the output of said character generator.

6. Apparatus as claimed in claim 2, including a mask store adapted to store bit patterns indicative of masks, and logic mixing means for logically combining a bit pattern representing a selected mask with an associated bit pattern representing an image call from said character generator in accordance with the attribute bits stored in said attribute buffer.

7. Apparatus as claimed in claim 1, including a second character buffer for storing character codes from said processor, a second character generator and mixing means for logically combining bit patterns from said first and second character generator.

8. Apparatus as claimed in claim 7, including means for operating said mixing means under control of attribute bits from said attribute buffer.

9. Apparatus as claimed in either claim 7 or claim 8, wherein said mixing means is a summing amplifier having means to give different intensity values to image cells to be displayed on said display device.

* * * * *